United States Patent [19]
Engeler et al.

[11] 3,898,685

[45] Aug. 5, 1975

[54] CHARGE COUPLED IMAGING DEVICE WITH SEPARATE SENSING AND SHIFT-OUT ARRAYS

[75] Inventors: William E. Engeler, Scotia; Jerome J. Tiemann, Schenectady, both of N.Y.

[73] Assignee: General Electric Company, Schenectady, N.Y.

[22] Filed: Aug. 27, 1973

[21] Appl. No.: 391,634

Related U.S. Application Data

[63] Continuation of Ser. No. 240,843, April 3, 1973, abandoned, which is a continuation of Ser. No. 69,651, Sept. 4, 1970, abandoned.

[52] U.S. Cl. .............. 357/24; 307/221 D; 307/304; 357/30; 357/32; 357/71

[51] Int. Cl. ......................... H01l 17/00; H01l 19/00

[58] Field of Search ........... 357/24; 307/304, 221 D

[56] References Cited

UNITED STATES PATENTS

| | | | |
|---|---|---|---|
| 3,651,349 | 3/1972 | Kahng et al. | 357/24 |
| 3,654,499 | 4/1972 | Smith | 357/24 |

*Primary Examiner*—Michael J. Lynch
*Assistant Examiner*—William D. Larkins
*Attorney, Agent, or Firm*—Julius J. Zaskalicky; Joseph T. Cohen; Jerome C. Squillaro

[57] ABSTRACT

Method and apparatus for moving selected electrical charges along the surface-adjacent portions of a semiconductor substrate are described. In one embodiment, a conductor-insulator-semiconductor structure including an array of cellules formed in the insulator layer substantially defines potential wells in the semiconductor for storing electrical charges. Electrical charges are stored in the potential wells by an electric field produced from a voltage applied to an overlying conductor member. By arranging the cellules in rows and columns with row-associated "hold" lines, row-associated "charge transfer channels" and column-associated transfer means, selected electrical charges may be transferred along the surface-adjacent portions of the semiconductor underlying the charge transfer channels while other charges continue to be stored. Electrical charges representative of analog or digital information may be selectively introduced or removed from the potential wells by a single column-associated transfer means.

8 Claims, 4 Drawing Figures

CHARGE COUPLED IMAGING DEVICE WITH SEPARATE SENSING AND SHIFT-OUT ARRAYS

This is a continuation of application Serial No. 240843, filed Apr. 3, 1973, now abandoned, which was a continuation of application Ser. No. 69,651, filed Sept. 4, 1970 now abandoned.

The present invention relates to methods and apparatus for storage and transfer of electrical charges and more particularly to the selective movement of stored charges. This application is related to U.S. Pat. Nos. 3,623,026, 3,781,827, 3,795,847 and 3,770,988, of common assignee as the instant application and which are incorporated herein by reference thereto.

The importance of information storage and handling devices and in particular those employing conductor-insulator-semiconductor (CIS) structures wherein the information is stored and transferred in the form of electrical charges along the semiconductor-insulator-interface is described in detail in the above-referenced applications. Basically, the CIS structure provides storage of electrical charges by the formation of depletion regions in the semiconductor underlying the conductor member. The electrical charges to be stored are generated either within the semiconductor itself in response to electromagnetic radiation or through injecting electrodes, for example. The above-identified copending applications disclose various arrangements of conductor members for transferring electrical charges along the surface of the semiconductor substrate by incrementally moving the charges from one depletion region to another. As disclosed, high density, high speed storage and transfer of stored charges is provided.

In some information storage and processing systems it is often desirable to selectively move certain stored information from one storage location to another storage location while leaving other information unaffected. For example, a particular digital word stored among a group of words may be temporarily transferred from a memory to a binary adder for arithmetic processing, for example, and then the output of the binary adder returned to the memory. Alternately, information may be removed from a specific storage location so that other information may be stored temporarily at this location, then subsequently removed and the first information returned again to this location. In the case of analog information, for example, it is often desirable to selectively transfer certain groups of information sequentially. For example, in our CIS solid state integration and storage device disclosed in our copending U.S. Pat. No. 3,781,827, electrical read-out from an array of storage elements is provided on a row-by-row or column-by-column basis. While the various methods and apparatus disclosed in our copending applications have wide utility, certain improvements therein can extend this utility still further.

It is, therefore, an object of the present invention to provide an improved method and apparatus for moving selected information in the form of stored electrical charges along the surface of a semiconductor substrate.

It is a further object of this invention to provide a method and apparatus for selectively transferring stored charges between different locations on a semiconductor substrate.

It is yet another object of this invention to provide methods and apparatus for holding certain electrical charges in selected locations of a semiconductor substrate for selectively variable times while releasing other electrical charges for transfer to other locations.

It is still a further object of this invention to provide methods and apparatus for transferring selected electrical charges along the surface of a semiconductor substrate while holding other electrical charges in their storage locations.

Briefly, in accord with one embodiment of our invention, electrical charges are stored and transferred along the surface-adjacent portions of a semiconductor substrate. This is achieved by providing a conductor-insulator-semiconductor storage and transfer apparatus including an array of cellules formed in an insulator layer overlying the semiconductor substrate. The cellules may, for example, be arranged in rows and columns with a hold line insulatingly overlying each row of cellules and a charge transfer channel interconnected with each row of cellules. In one mode of operation, electrical charges are stored in potential wells formed in the surface-adjacent portions of the semiconductor substrate underlying the cellules by the application of a semiconductor depletion region forming electric potential to the hold lines. The potential wells are made sufficiently deep so that the charges stored therein are substantially unaffected by the electric field associated with a network of charge transfer lines insulatingly overlying the hold lines and the transfer channels. By controllably removing the electric potential from a selected hold line however, the deep potential wells are no longer present and the electric charges stored under that hold line are now influenced by the electric field from the charge transfer lines. Under this influence, the charges are transferred to the row-associated charge transfer channel and from there to a bi-directional send-receive device, for example, for use elsewhere in the processing system. In another mode of operation, electrical charges are introduced into the charge transfer channel from a bi-directional send-receive device. These charges, under the influence of the electric field from the charge transfer lines, are brought to the desired storage location and are stored there by the application of an electric potential to the hold line.

The stored charges within the array may be representative of digital or analog signals transferred to the array through the charge transfer channels or generated within the array in response to electromagnetic radiation, for example, wherein the stored charges are representative of the incident radiation on the semiconductor substrate.

The novel features believed characteristic of the present invention are set forth in the appended claims. The invention itself, together with further objects and advantages thereof may best be understood by reference to the following detailed description taken in connection with the appended drawing in which:

Figure 1:
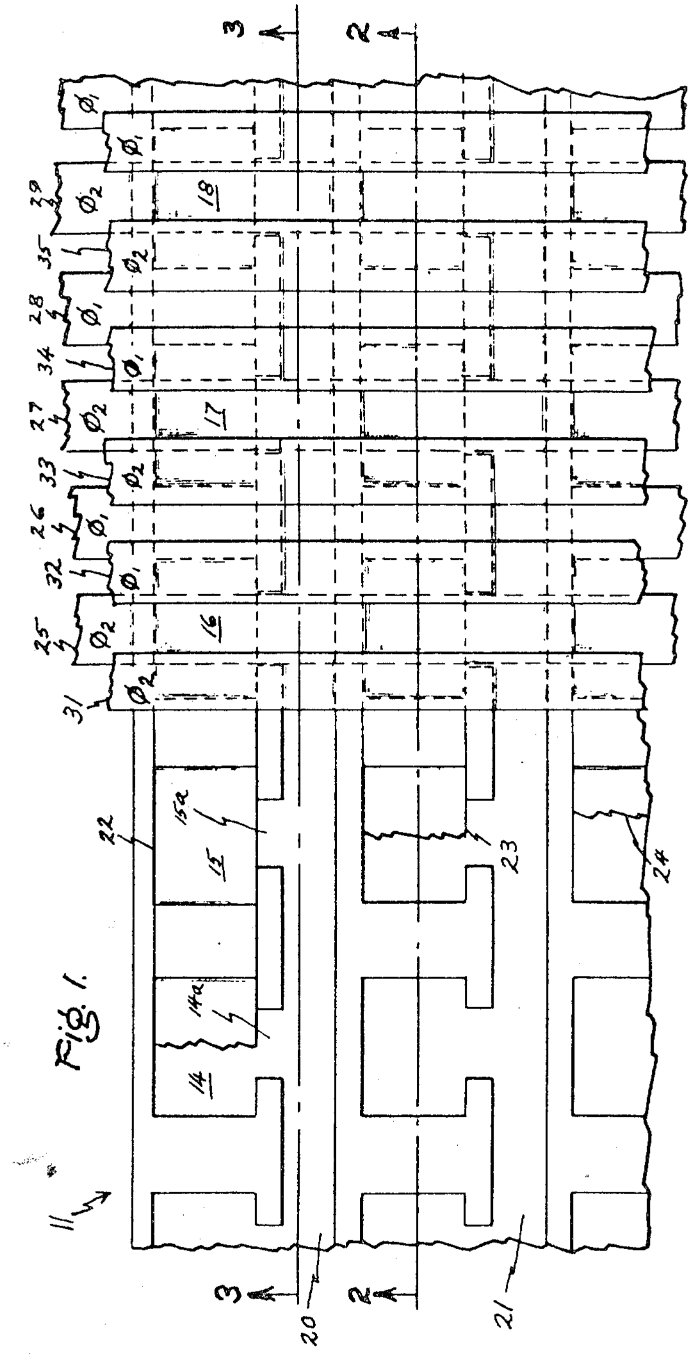
FIG. 1 is a partial plan view of a conductor-insulator-semiconductor array of storage devices including apparatus for transferring selected electrical charges from one location to another.

FIG. 1 illustrates, by way of example, an embodiment of our present invention as a portion of a two-dimensional solid state addressable, storage and transfer apparatus 11 comprising a conductor-insulator-semiconductor (CIS) structure. Basically, the CIS structure includes a substrate of semiconductor material 12 of substantially one electrical conductivity type, such as *n*-type silicon, for example, with an insulator layer 13 formed thereover. The insulator layer may, for example, be silicon dioxide, silicon nitride, silicon oxynitride, combinations thereof or any of the other useful insulator materials. The insulator layer 13 includes a plurality of cellules 14 through 18, for example, arranged in a row with similar rows of cellules adjacent thereto. Each cellule is formed in the insulator layer as a region of thinner insulator material than the surrounding walls of the cellule. The formation of the cellules may, for example, be provided by selective masking and etching of the insulator material by techniques well known to those skilled in the art. Each row of cellules is separated from the next adjacent row of cellules by a channel formed in the insulating layer 13. FIG. 1 illustrates these channels by the numerals 20 and 21. FIG. 1 also illustrates openings 14*a* through 18*a* along the side walls of each cellule 14 through 18, respectively, which openings interconnect the cellules with the channel 20. The cellules of the next adjacent row have similar openings which interconnect those cellules with the channel 21. The channels 20 and 21, along with the openings in the side walls of each cellule may, for example, be formed at substantially the same time as the cellules are formed. Each channel and interconnecting opening between the cellules and the channels are conveniently of the same depth in the insulator layer so that the cellules, channels and interconnecting openings may all be formed at the same time.

In accord with the simplified embodiment of our invention illustrated in FIG. 1, the CIS structure is completed by providing a conductor member 22 which overlies the cellules of row 1 and functions as a charge "hold line." A similar conductor member 23 overlies the cellules of row 2 and yet a third conductor member 24 overlies the cellules of row 3. The conductor members 22, 23 and 24 may, for example, be formed by depositing a continuous conductive material over the insulator layer and then appropriately masking and etching this layer to form the conductor members 22, 23 and 24. Conductive materials such as molybdenum, tungsten, tantalum, aluminum, gold, silver, platinum, silicon, germanium, or any of the other numerous non-reactive, conducting and semiconducting materials may advantageously be employed in practising the present invention.

The storage of electrical charges within the CIS structure illustrated in FIG. 1 can be understood by those skilled in the art from the following description. A semiconductor material of n-type silicon, for example, is covered with an insulator layer of pyrolytically grown silicon dioxide having a thickness of approximately 10,000 Angstroms. Cellular regions are etched in the silicon dioxide to a depth of approximately 9,000 A to produce a silicon dioxide thickness of about 1,000 A over the silicon in the cellular regions and the channel regions. Depletion regions are formed in those portions of the semiconductor substrate underlying the cellules while no depletion regions are formed elsewhere by the selective application of depletion region forming voltages to the conductor members 22, 23 and 24. For example, with the aforementioned insulator thicknesses, a 10-volt potential applied between the conductor member 22 and the semiconductor material 12 produces depletion regions only in those portions of the semiconductor substrate underlying the cellules 14 through 18. Those skilled in the art can appreciate that the effective depth of the depletion region can be altered by varying the magnitude of the depletion region forming voltage or the thickness of the insulator layer. Further, by proper choice of the semiconductor material 11, the rate of arrival of minority carriers due to tunneling and avalanche multiplication at the surface of the semiconductor substrate can be rendered negligible for the storage times involved. Since the depletion regions also collect minority carriers existing in the semiconductor substrate due to normal thermal generation-recombination processes, the storage time in the depletion region is selected so that the effect of minority carriers arriving at the surface of the semiconductor due to thermal generation produces negligible effects. For the case of silicon, for example, at room temperatures, storage time intervals in the order of milliseconds and longer may be achieved before equilibrium through thermal generation is reached for the depletion region depths employed herein. Therefore, by insuring that no other source of minority carriers is present, after forming the depletion regions and removing or isolating the applied electric potential from the conductor members 22, 23 and 24, minority carriers may be controllably generated in response to electromagnetic radiation, for example, as shown by electromagnetic radiation rays 19. Alternately, minority carriers may be injected into the semiconductor by a P-N junction or a point contact, if desired.

When electromagnetic radiation, in the form of rays or images, for example, impinges on the semiconductor material 12, minority carriers are generated therein in proportional response to the radiation flux intensity. These minority carriers are swept to the semiconductor surface in response to the depletion region forming field and are stored within the depletion regions underlying the cellules 14 through 18. For time intervals shorter than the surface equilibration time, the amount of charge stored in each of the depletion regions is a direct measure of the integrated local radiation flux in the vicinity of the depletion region.

The depletion regions formed under the cellules as a result of the voltage potential applied to the hold lines are hereinafter called "potential wells" since they are depletion regions at the semiconductor surface which, as stated above, have the ability to store minority carriers. The term "potential well" is also used to distinguish depletion regions which store electrical charges for selectively variable times from those which are used to transfer electrical charges and only provide temporary storage.

In accord with one of the novel features of our present invention, electrical charges introduced into potential wells by electromagnetic radiation, a P-N junction, a point contact or the launch-receive devices more fully disclosed in our U.S. Pat. No. 3,770,988, for example, can be transferred from their respective potential wells to a transfer channel and from there to an output device while holding or continuing to store all other electric charges. In accord with yet another feature of our invention, the transfer of all charges is achieved by a single group of continuously clocking transfer signals which, however, are only able to transfer the selected electric charges with substantially no effect on other electric charges stored in the non-selected potential wells. These and other novel features of our invention are appreciated, for example, by the following description taken in connection with the accompanying drawing.

Figure 2:
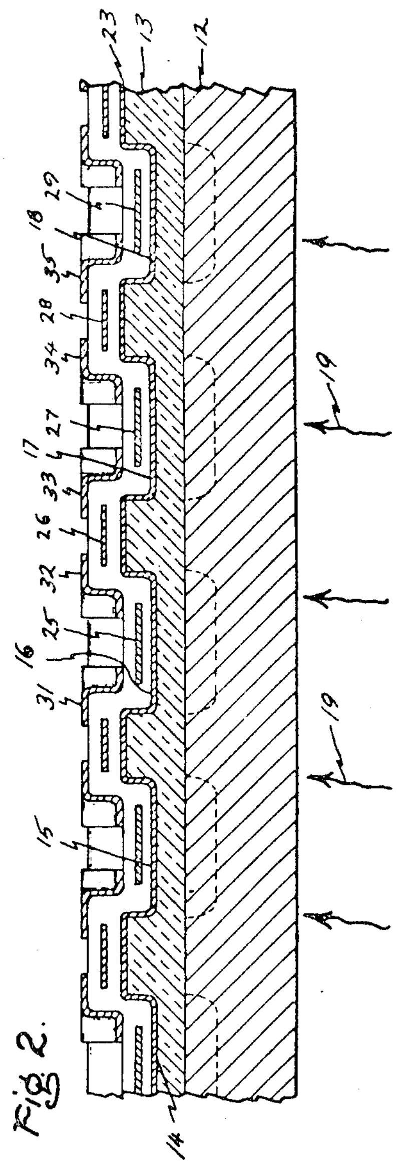
FIG. 2 is a partial cross-sectional view of the embodiment illustrated in FIG. 2 taken along the line 2-2.

In FIG. 1, a plurality of transfer lines 25–29 and 31–35 are illustrated as insulatingly disposed over the cellules and charge transfer channels. These transfer lines are positioned substantially orthogonal to the conductor members 22, 23 and 24. The overlapping relationship of these transfer lines is more clearly illustrated in FIG. 2 which is a cross-sectional view taken along the lines 2—2 of FIG. 1. In FIG. 2, a first group of transfer lines includes members 25 through 29 and a second group of transfer lines includes members 31 through 35. Each member of the first group of members insulatingly overlies the cellules, the charge transfer channels and the interconnecting opening therebetween for a single column of cellules. As also illustrated in the drawing, each member 31 through 35 insulatingly overlaps adjacent members of the first group.

Figure 3:
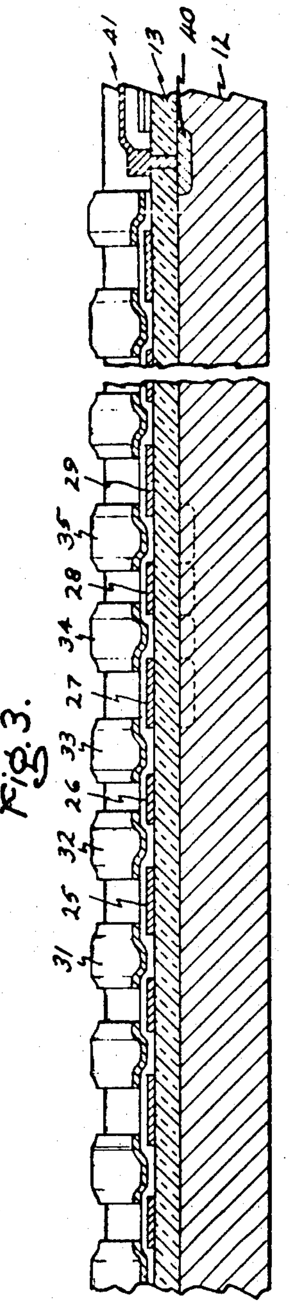
FIG. 3 is a partial cross-sectional view of the embodiment illustrated in FIG. 2 taken along the lines 3-3.

FIG. 3, a cross-sectional view taken along the lines 3—3 of FIG. 1, illustrates a portion of the charge transfer channel 21 with the overlapping charge transfer lines. FIG. 3 also illustrates a P-N junction 40 formed in the semiconductor substrate 12. The P-N junction 40 may, for example, be provided by diffusion through an aperture in the insulator layer 13 which may subsequently be used to make contact to the diffused region, such as is illustrated by contact 41. As will be described more fully below, the P-N junction 40 may be used as a bi-directional send-receive device; that is, it may be used to introduce electrical charges into the semiconductor substrate or to remove charges therefrom.

The operation of the storage and transfer apparatus illustrated in FIGS. 1 through 3 can be understood by considering the sequence of events which occur in one mode of operation. For example, assume that an optical image in the form of light rays 25 are focused on the semiconductor substrate 12. Depending upon the intensity of the light signals striking the semiconductor material, a proportionate number of minority carriers are generated. With the application of depletion region forming voltages $V_1$, $V_2$ and $V_3$, for example, to conductor members 22, 23 and 24, respectively, the minority carriers generated by the incident light signals are collected in the potential wells underlying the cellules near the surface of the semiconductor material. As the light signals continue to impinge on the semiconductor material, the potential wells continue to accept minority carriers and provide integration of the light signals. After a suitable period of time, the electrical charges stored in the potential wells may be selectively removed from these regions and transferred to external circuitry through the P-N junction 40, for example.

The transfer of electrical charges is achieved by applying clock signals or transfer signals to the transfer lines 25 through 29 and 31 through 35 and by removing the depletion region forming voltage from one of the hold lines 22, 23 or 24. The transfer signals may, for example, comprise two signals of substantially the same frequency and waveshape but shifted in time by one-half the period and switching between two different voltage levels, such as is more fully described in our co-pending U.S. Pat. No. 3,795,847. If the first of these voltage signals is $\phi_1$ and the second is $\phi_2$, then by connecting these voltage signals to the transfer lines in the manner illustrated in FIGS. 1 and 3 of the drawing, surface charges may be transferred from one location to another on the semiconductor substrate. The magnitude of the voltage signals $\phi_1$ and $\phi_2$ is selected so that depletion regions are formed within the channel regions 20 and 21 and the openings between the channels and the cellules but not in regions where the insulator layer is substantially thicker than in the channel regions. Additionally, the depth of the potential well depletion region formed under each cellule is adjusted so that with a maximum electrical charge stored therein, no substantial change in charge is effected by the application of the transfer signals to the overlying transfer lines. In other words, the depletion region forming voltages when applied to conductor members 22, 23 and 24, hold or store the electrical charges in sufficiently deep potential wells that the charges are substantially unaffected by the presence of the shallower depletion regions underlying the transfer lines. However, when a depletion region forming voltage is removed from a hold line, the deep potential wells are no longer present and the electric charges stored under that hold line are now influenced by the electric field from the charge transfer lines. Under this influence, the electric charges are transferred to the row-associated charge transfer channel and from there to a receive device such as a P-N junction, for example.

The release or "read-out" of electric charges from selected locations on the semiconductor substrate can be understood by considering the following example. Assume that read-out of the electric charges stored in row one is desired. By reducing or removing the depletion region forming voltage $V_1$ from the hold line conductor member 22 while maintaining voltages $V_2$ and $V_3$ on hold line conductor members 23 and 24, the electric charges stored within the potential wells underlying the conductor member 22 are no longer under the influence of the hold line electric field, but are now influenced by the electric fields from the charge transfer lines. By synchronizing the removal of the voltage from member 22 with the application of transfer signals to transfer lines 25, 27 and 29, for example, the released charges flow into the row-associated charge transfer channel 20 through the interconnecting openings 14*a* – 18*a* and then along the semiconductor surface underlying the charge transfer channel 20 to the P-N junction 40. The transfer of electrical charges along the channel 20 is provided by the transfer signals $\phi_1$ and $\phi_2$ which, in switching from one voltage level to another, sequentially move the electric fields and hence the electric charges along the transfer channel. For a more detailed description of the electric charge transfer and for other means for transferring charges along the surface of a semiconductor substrate also useful in practising this invention, reference may be made to our U.S. Pat. No. 3,795,847.

During the time interval that the electric charges are transferred from row one along the charge transfer channel, the other rows are still holding or storing their electric charges. In fact, if the electric charges are formed from the generation of minority carriers by incident electromagnetic radiation, these other rows continue to store and integrate the incident radiation. After read-out of the information from row one, the depletion region forming voltage may again be applied to conductor member 22 and the depletion region forming voltage removed from conductor 23, for example. The electrical charges underlying this conductor are then transferred to the row-associated charge transfer channel 21 and the electric charges are moved along this channel by similar transfer signals in substantially the same manner as described above with respect to row one. This mode of read-out is continued until all rows are scanned and then the sequence begins again.

The read-out of stored electrical charges on a row-by-row basis produces a voltage signal representative of the stored electrical charges. In the case where the charges are produced by electromagnetic radiation incident on the semiconductor substrate, the voltage signal is substantially similar to a video signal produced from an image converter. By appropriately synchronizing the read-out of stored electric charges with a suitable cathode ray tube display, for example, the stored electric charges can be displayed thereon. Those skilled in the art can readily appreciate that such a storage and transfer device which does not require the use of a scanning electron beam has great commercial utility.

Figure 4:
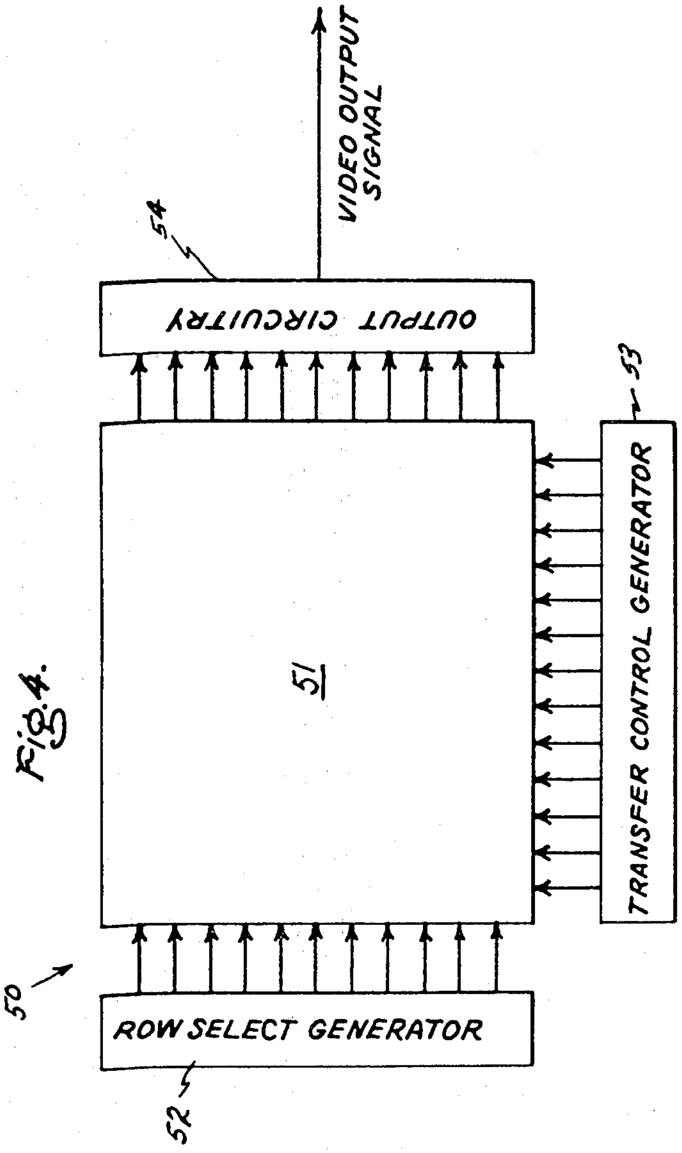
FIG. 4 is a schematic illustration of a solid state addressable electro-optical converter in accord with another embodiment of our invention.

A particularly useful embodiment of our invention is illustrated in FIG. 4 wherein a two-dimensional optical image converter 50 comprising an integrated array of CIS storage elements 51 are arranged in an "X-Y Pattern" on a semiconductor substrate. The storage elements and the transfer channels are substantially similar to those described above and operate in substantially the same manner. The optical image converter 50 further comprises row select generator circuitry 52 which may, for example, be fabricated on the semiconductor substrate as integrated circuitry and include the necessary circuitry to scan each row and provide the depletion region forming voltages to the appropriate conductor member hold lines during the read-in times and to selectively remove these voltages during the read-out times. The optical image converter 50 also includes a transfer control generator 53, which may, for example, include a two-or three-phase clocking system for controlling the transfer of electrical charges through the transfer channels. Suitable circuitry for performing this function is well known in the art and may also be included in the form of integrated circuitry, if desired. Electrical output signals from the storage elements 51 are obtained from suitable output circuitry 54 which may, for example, include P-N junctions associated with each transfer channel or a single P-N junction which interconnects all output channels. Alternately, various combinations of P-N junctions or other suitable devices such as those described in our U.S. Pat. No. 3,770,988 may be employed for extracting surface charges from the array of storage elements 51. The output signal derived from the output circuitry 54 is illustrated in FIG. 4 as a video output signal, such as that obtained from a camera tube.

The operation of the embodiment illustrated in FIG. 4 is easily understood by considering the timing relationship of signals applied to the image converter 50 during a cycle of operation. For example, if a cycle of operation is divided between read-in and read-out, then during the read-in time, depletion region forming voltages are applied to all hold lines. During this time electromagnetic radiation incident on the semiconductor generates minority carriers which are stored and integrated in the potential wells. During the read-out time, the stored electric charges are sequentially read-out on a row-by-row basis by applying transfer signals, such as $\phi_1$ and $\phi_2$, for example, to the transfer lines and sequentially removing the depletion region forming voltages from the hold lines so that the electrical charges from each row are sequentially read-out to the output circuitry 54. The release of selected electrical charges on a row-by-row basis is desirably synchronized with the application of a transfer signal applied to a transfer line overlying the cellule and the opening interconnecting the cellule and the channel. More specifically and with reference to FIG. 1 of the drawing, read-out of electrical charges from row one is desirable initiated by the removal of the depletion region forming voltage $V_1$ from hold line 22 at the same time that voltages (i.e., $\phi_2$) are being applied to charge transfer lines 25, 27 and 29. In this way, the stored electrical charges are always under the influence of an electric field and are hence not permitted to return to the bulk semiconductor. Read-out from each of the other rows is also synchronized in the same manner. This method of operation substantially reduces the loss of any portion of the electrical charges to the bulk semiconductor and hence enhances the transfer of electrical charges along the surface of the semiconductor substrate. In addition to being useful as an image converter, the storage and transfer apparatus of the instant invention can also be employed for the storage and transfer of digital information. For example, digital information may be introduced into the storage and transfer apparatus by the P-N junction 40 while the depletion region forming voltage is removed from the conductor member 22. As the electrical charges are moved down the transfer channel, at some point in time the depletion region forming voltage is applied to conductor member 22 and the electrical charges in the transfer channel are quickly swept to the depletion region potential wells underlying the cellules since these depletion regions are much deeper than those in the channel 21. Once stored in the potential wells, the electrical charges may be held for a suitable period of time and then transferred to another location or to output circuitry for performing logic functions, if desired. Those skilled in the art can readily appreciate that one of the most desirable characteristics of our invention is the ability to hold electric charges representative of information for selectively variable periods of time and to release selected electric charges merely by removal of a depletion region forming voltage from a conductor member hold line. Conversely, charges may be stored in the surface-adjacent portions of the semiconductor substrate merely by applying a depletion region forming voltage.

Although our invention has been described with reference to specific embodiments thereof, it is to be understood that various modifications and changes may be made thereto. For example, although the transfer lines are illustrated as comprising a plurality of overlapping members, it is to be understood that various other transfer means could be employed. For example, in our U.S. Pat. No. 3,795,847, we have disclosed not only overlapping arrangements of conductors but also interdigitated arrangements of conductors and further in addition to employing twophase clocking signals, even three-phase clocking signals may be employed. Accordingly, it is to be understood that these and other means for transferring electrical charges may also be employed if desired. Additionally, various methods may be employed for making the arrays of storage elements and transfer channels described above. For example, from the standpoint of compactness of array elements and compatability with the formation of suitable control circuitry and generators, the self-registering semiconductor technology as described in our copending applications Ser. No. 679,947, now U.S. Pat. No. 3,566,518, and Ser. No. 675,228 filed Oct. 13, 1967, now U.S. Pat. No. 3,566,517, and assigned to the same assignee of the present invention, are particularly useful in fabricating the apparatus described herein.

Although our invention is described with reference to a silicon substrate and an insulating layer of silicon dioxide, other materials may also be employed. For example, semiconductor materials such as germanium, Group III-V and II-VI such as cadmium sulfide, gallium arsenide and indium antimonide may be employed and insulator materials such as silicon nitride, silicon oxynitride or combinations of insulators may be employed if desired. Accordingly, our invention is not limited to any specific material or combination of materials, but includes numerous combinations of materials which produce the desired results in practising our invention.

In summary, we have described a novel method and apparatus for storing and selectively transferring electric charges along the surface-adjacent portions of a semiconductor substrate. By providing means for holding selected electric charges while releasing other charges to a transfer channel, the stored charges may be manipulated in various manners which are readily adaptable to digital data processing systems or to optical image converting systems, for example.

Therefore, while the invention has been described with respect to certain embodiments, many modifications and variations will occur to those skilled in the art. Accordingly, by the appended claims we intend to cover all such modifications and changes as fall within the true spirit and scope of our present invention.

What we claim as new and desired to secure by Letters Patent by the United States is:

1. A semiconductor electrooptical converter comprising a substrate of semiconductor material, a first conducting member insulated from said substrate and spaced at regularly spaced portions along its length in relation to said substrate to define a first plurality of storage regions in said substrate, each storage region underlying a respective regularly spaced portion of said first conducting member, a plurality of conductive electrodes insulatingly spaced adjacent to said conducting member and successively along the length thereof, said conductive electrodes insulatingly overlying said substrate to define a second plurality of storage regions in said substrate, each storage region underlying a respective conductive electrode, said conductive electrodes and corresponding storage regions being arranged into at least two sets with each of the electrodes of one set being succeeded by a respective electrode of another set, means for coupling each of the storage regions of said first plurality to a respective adjacent storage region of one of said sets, means including said electrodes and corresponding charge storage regions forming a charge storage and transfer channel for the transfer of charge along the surface adjacent portion of said substrate, means for exposing said substrate to a spatially varying pattern of radiation to develop and store charges of variable quantity in said storage regions of said first plurality.

2. The combination of claim 1 in which means are provided for applying differently phased voltages to said charge storage and transfer channel including said electrodes to form shallow progressing potential wells for transferring charge therein and in which means are provided for concurrently storing charge in said storage region of said first plurality including applying a voltage to said conducting member which produces deep potential wells in said storage regions.

3. The combination of claim 1 including means for applying a first voltage to said first conducting member to establish potential wells in said storage regions of said first plurality for storing charge therein, means for transferring charge from said storage regions of said first plurality to adjacent storage regions of said one set of said second plurality, means for applying differently phased depletion producing voltages to said charge storage and transfer channel including said electrodes to incrementally move said transferred charge in said storage and transfer channel.

4. The combination of claim 3 in which said first voltage establishes deep potential wells in said storage regions of said first plurality, in which said differently phased depletion producing voltages produce shallow potential wells in said storage regions of said second plurality, and in which said means for transferring charges from said storage regions of said first plurality to said storage regions of said second plurality includes means for altering said first voltage to reduce the depth of said potential well to cause charge to flow from said storage regions of said first plurality to storage regions of said second plurality.

5. The combination of claim 4, further including a second conducting member extending generally parallel to said first conducting member, said second conducting member being insulated from said substrate and spaced at regularly spaced portions along its length in relation to said substrate to define a third plurality of storage regions, each storage region of said third plurality underlying a respective regularly spaced portion of said second conducting member, said plurality of conducting electrodes insulatingly overlying said substrate to define a fourth plurality of storage regions in said substrate, each storage region of said fourth plurality underlying a respective conductive electrode, said conductive electrodes and corresponding storage regions of said fourth plurality being arranged into at least two sets with each of the electrodes of one set being succeeded by a respective electrode of another set, means for coupling each of the storage regions of said third plurality to a respective adjacent storage region of one of said sets of said fourth plurality, means including said electrodes and corresponding charge storage regions of said fourth plurality forming a second charge storage and transfer channel for the transfer of charge along the surface adjacent portion of said substrate, means for applying a second voltage to said second conducting member to establish potential wells in said storage regions of said third plurality for storing charge therein, said second voltage establishing deep potential wells in said storage regions of said third plurality, means for reestablishing said first voltage on said first conducting member to provide said deep potential wells in said storage regions of said first plurality, means for transferring charges from said storage regions of said third plurality to said storage regions of said fourth plurality including means for altering said second voltage to reduce the depth of said potential wells of said third plurality to cause charge to flow from said storage regions of said third plurality to storage regions of said fourth plurality, said means for reestablishing said first voltage enabling storage of charge in said storage regions of said first plurality while charge is being incrementally moved in said second charge storage and transfer channel.

6. The combination of claim 1 in which said means for transferring charge from said storage regions of said first plurality to storage regions of said second plurality include electrodes of said one set provided with portions which insulatingly overlap said conducting member.

7. The combination of claim 1 in which said electrodes consist of two sets and said means for transferring charge include other electrodes each insulatingly overlying a respective pair of successive electrodes of said sets.

8. The combination of claim 1 in which said storage regions of said first plurality are equal in number to the storage regions of said one set of said second plurality.

* * * * *